March 31, 1936. W. W. WILLIAMS 2,035,854
COMPRESSOR
Filed June 11, 1934
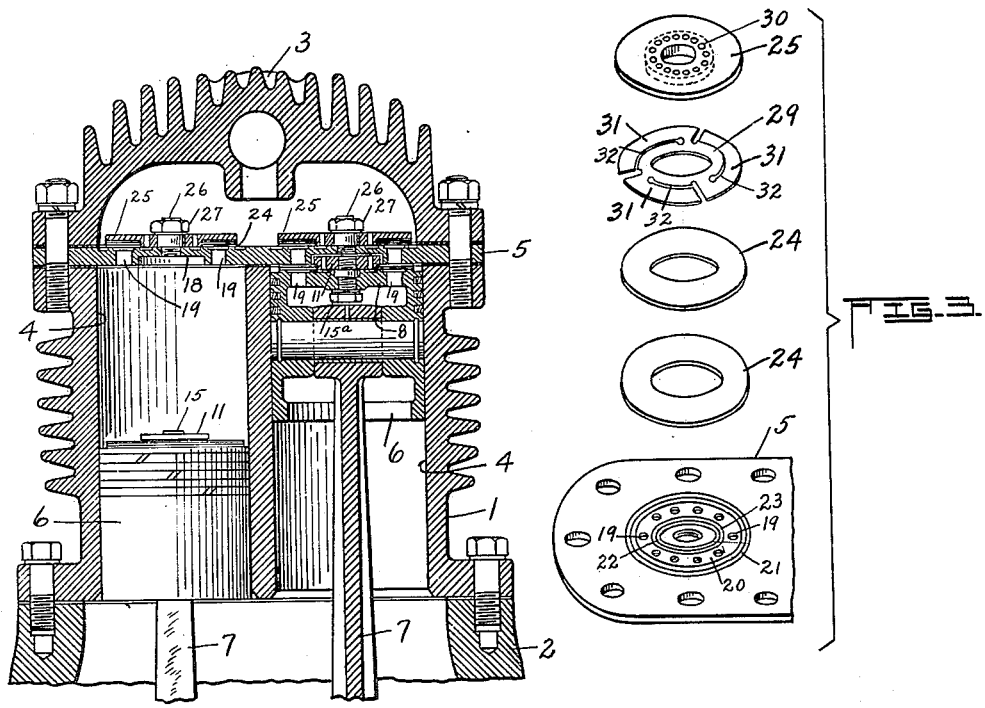
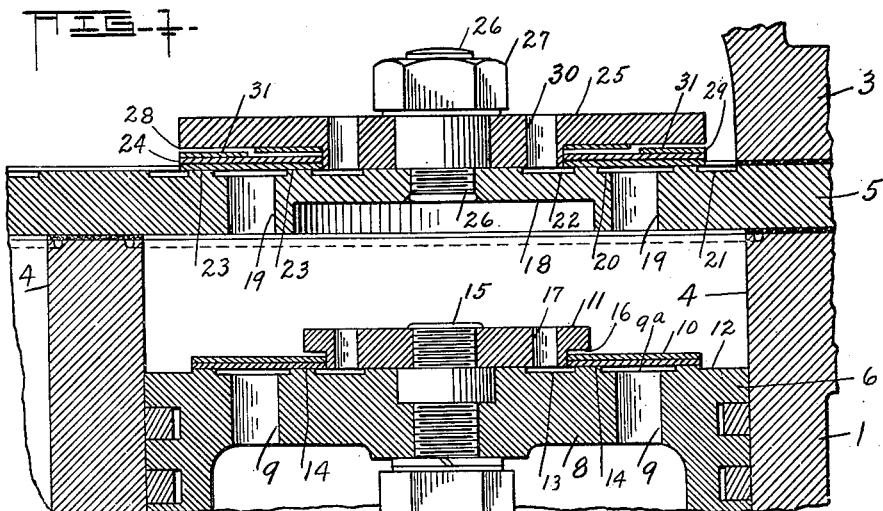
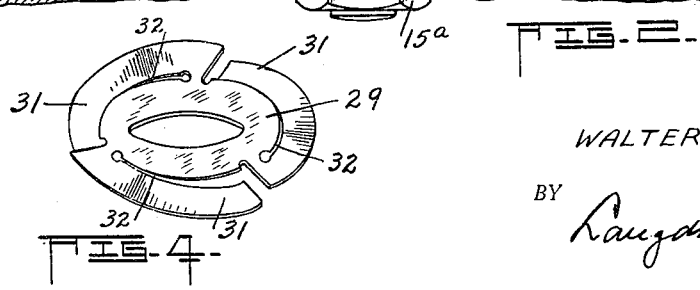
INVENTOR.
WALTER W. WILLIAMS
BY Langdon Moore
ATTORNEY.

Patented Mar. 31, 1936

2,035,854

UNITED STATES PATENT OFFICE 2,035,854

COMPRESSOR

Walter W. Williams, Bloomington, Ill.

Application June 11, 1934, Serial No. 730,022

6 Claims. (Cl. 230—191)

This invention relates to improvements in compressors and more particularly to compressors for use in the compression type of refrigeration apparatus.

It is an object of this invention to provide an improved valve in compressors employed in compressing the gaseous refrigerant in a compression type of refrigerating apparatus which are simple in construction, positive in action, and substantially noiseless in operation. While these improved valves may be most advantageously employed for the purpose above described, it is to be understood that the invention is not limited to this application.

With these and other objects in view, reference is made to the accompanying sheet of drawing which illustrates a preferred embodiment of this invention with the understanding that minor changes may be made without departing from the scope thereof.

In the drawing:

Figure 1 is a view in vertical central section of a compressor illustrating a preferred embodiment of this invention.

Figure 2 is an enlarged fragmentary detail view, similar to Figure 1.

Figure 3 is a projected view in perspective, illustrating the various parts of this improved valve.

Figure 4 is an enlarged detail view in perspective of the valve spring.

The embodiment of this invention illustrated in Figure 1 includes a two-cylinder compressor block 1 mounted upon a crank case 2 and closed by a head 3. The upper ends of the compression cylinders 4 are closed by a valve plate 5 secured between the block 1 and head 3.

The piston 6 mounts the usual connecting rod 7 and the upper closed end 8 is preferably provided with a plurality of circular ports 9, the centers of which are arranged upon a circle concentric with the axis of the piston. A plurality of thin, flexible metal annuli 10, concentric with the axis of the piston, are positioned by an undercut circular plate 11 secured concentric with the axis of the piston to the closure 8 which positions the said annuli to cover the ports 9 to form a laminated valve therefor. It is preferable to enlarge the opening of each port 9 under the laminated valve by providing an annular groove 9ª upon the upper surface of the closure 8 into which the ports 9 open and likewise provide annular grooves 12 and 13 of a similar depth upon the upper surface of the closure 8 spaced apart on each side port groove 9ª, whereby the laminated valve seats upon the spaced-apart annular surfaces 14 of the end closure 8 on the opposite sides of the groove 9ª. The cylindrical centering plate 11 is preferably secured to the closure 8 by the threaded bolt 15 and nut 15ª. The lower circumference of the plate 11 is undercut at 16 a sufficient distance to allow a slight movement to the laminated valve annuli 10 to unseat said valves upon the down or intake stroke of the piston. The centering plate 11 is also preferably provided with a plurality of circular ports 17, arranged upon the arc of the circle concentric with the axis of the piston, which open into the annular groove 13, whereby, when the laminated valve 10 is unseated during the downward movement of the piston, the fluid may pass over the annular seat 14 of the ports 9 to enter the groove 13 and be discharged therefrom through the port 17.

It is preferable to provide the valve plate 5 with a depression 18 upon the underside thereof adapted to receive therein the centering plate 11 upon each piston when the piston has completed its upward or compression stroke, as shown in Figure 1. The valve plate 5 is provided with a plurality of circular ports 19, the centers of which are arranged upon a circle concentric with the axis of the piston, which ports 19 are preferably formed of the same size as the ports 9 and arranged at the same distance from the axis of the piston. The upper surface of the plate 5 is cut out to provide an annular groove 20 into which the ports 19 open, and the upper surface is likewise provided with annular grooves 21 and 22, of the same depth, spaced apart on each side of the port groove 20, providing annular seats 23 on each side thereof. A plurality of thin, flexible metal annuli 24 are centered over the ports 19 by an undercut centering plate 25 preferably secured to the upper surface of the valve plate 5 by the axial bolt 26 with the nut 27 threaded on the upper side thereof. The centering plate 25 is preferably of the same radius as the greatest radius of the laminated valve 24. The undercut portion 28 of the centering plate 25 is cut out a sufficient distance to allow an annular disc valve spring 29 of the same dimensions as the annuli 24 to be interposed between the said annuli 24 forming the laminated valve and the overlapping portion 28 of the centering plate 25. The centering plate 25 is provided with a plurality of circular ports 30, the centers of which are arranged upon a circle concentric with the axis of the piston and which are adapted to communicate with the annular groove 22 upon the upper surface of the valve plate 5.

A disc valve spring 29 is preferably interposed between the overlap 28 and the laminated valve, as shown in Figure 4. The disc valve spring 29 is preferably provided with three similar spring fingers 31 formed thereon by three spaced-apart annular slots 32 equally dividing the disc valve spring 29 with the corresponding end of each slot cut out to the periphery of the disc valve spring and with the free ends of the spring fingers 31 so formed bent downwardly from the body of the disc valve spring 29, whereby the spring fingers 31 normally maintain the laminated metal annuli 24 seated about the ports 19. Upon the compression or upward stroke of the piston, the fluid thereabove passes through the ports 19, compresses the spring fingers 31, and passes over the seats 23 into the groove 21 upon the exterior of the valve and into the groove 22 and through the ports 30, communicating therewith, and upon the downward stroke of the piston the spring fingers 31 immediately cause the laminated valve to seat.

The laminated valve on the valve plate, in combination with the disc valve spring, forms a self-seating valve upon the initiation of the stroke of the piston away from the valve plate. The annuli 24 forming the laminated valve being of very thin, flexible metal and having a three-point engagement with the disc valve spring 29 at the points of contact of the free ends of each of the three fingers 31, upon the stroke of the piston in the direction of the valve plate allows a flexing of the annuli and produces a lapping effect in the valve.

What I claim is:

1. In a compressor, the combination of a valved piston, a cylinder, a valve plate having a plurality of circular ports therein arranged with their respective centers on a circle concentric with the cylinder, an annular laminated valve disc adapted to close said ports on the side of the plate opposite the piston, a centering plate for the valve disc mounted on the valve plate having an undercut overhang extending completely thereover to limit the axial movement of the valve disc, and an annular spring member of substantially the same width as the plate interposed between the valve disc and centering plate, wherein the valve plate is provided with annular grooves on each side of the ports on the valve side forming annular seats for the laminated valve disc.

2. In a valve for the compressor of a compression type refrigerating machine, the combination of a valve plate closing the compression end of the cylinder, said plate having a plurality of circular ports arranged with their respective centers on a circle concentric with the cylinder, annular valve seats on each side of the circle of ports, a thin, flexible, annular valve disc mounted to seat on said ports to be lapped over each seat upon the suction stroke of the piston.

3. The structure of claim 2 wherein a valve centering and limiting member is mounted on the valve plate.

4. The structure of claim 2 wherein a valve centering and limiting member is mounted on the valve plate, and a spring member is interposed between the valve disc and valve limiting member.

5. In a valve for the compressor of a compression type refrigerating machine, the combination of a valve plate closing the compression end of the cylinder, said plate having a plurality of circular ports arranged with their respective centers on a circle concentric with the cylinder, annular valve seats on each side of the circle of ports, a nest of thin, flexible, annular valve discs mounted to seat on said ports and be lapped over each seat upon the suction stroke of the piston.

6. The structure of claim 5 wherein a valve centering and limiting member is mounted on the valve plate and a spring member is interposed between the nest of thin, flexible valve discs and the valve limiting member.

WALTER W. WILLIAMS.